US012729954B2

(12) United States Patent
Amourak et al.

(10) Patent No.: US 12,729,954 B2
(45) Date of Patent: Sep. 8, 2026

(54) LEVELLER CALIBRATION DEVICE

(71) Applicant: ArcelorMittal, Luxembourg (LU)

(72) Inventors: Mounir Amourak, Metz (FR); Olivier Madelaine-Dupuich, Metz (FR); Jean-Marc Hemmen, Verny (FR); Pierre Gauje, Klang (FR); Florent Sponem, Vigy (FR)

(73) Assignee: ArcelorMittal, Luxembourg (LU)

( * ) Notice: Subject to any disclaimer, the term of this patent is extended or adjusted under 35 U.S.C. 154(b) by 345 days.

(21) Appl. No.: 18/691,323

(22) PCT Filed: Sep. 17, 2021

(86) PCT No.: PCT/IB2021/058489

§ 371 (c)(1), (2) Date: Mar. 12, 2024

(87) PCT Pub. No.: WO2023/041958

PCT Pub. Date: Mar. 23, 2023

(65) Prior Publication Data

US 2024/0401935 A1 Dec. 5, 2024

(51) Int. Cl.
*G01B 11/16* (2006.01)
*G01B 21/04* (2006.01)
(Continued)

(52) U.S. Cl.
CPC .......... *G01B 11/165* (2013.01); *G01B 21/042* (2013.01); *G01D 5/35316* (2013.01); *G01D 18/00* (2013.01); *G02B 6/02042* (2013.01)

(58) Field of Classification Search
CPC ........ B21D 1/02; G01B 11/165; G01B 11/18; G01B 11/161; G01B 21/042;
(Continued)

(56) References Cited

U.S. PATENT DOCUMENTS

| | | | |
|---|---|---|---|
| 6,993,947 B2 | 2/2006 | Tondo et al. | |
| 7,584,638 B2 | 9/2009 | Madelaine-Dupuich et al. | |
| 2009/0263072 A1 * | 10/2009 | Albert | G01N 21/21 385/12 |

FOREIGN PATENT DOCUMENTS

| | | | |
|---|---|---|---|
| CN | 107956292 A * | 4/2018 | E04G 23/0218 |
| EP | 1635034 A1 | 3/2006 | |

OTHER PUBLICATIONS

Smartrod: "Smart fibres", Internet Citation, Jan. 1, 2006 (Jan. 1, 2006), XP003000107, http://www.smartfibres.com/Attachments/SmartRod.pdf.

(Continued)

*Primary Examiner* — John E Breene
*Assistant Examiner* — Daniel M Quinn
(74) *Attorney, Agent, or Firm* — Davidson Kappel LLC

(57) ABSTRACT

A calibrating bar, for calibrating a multi-roll leveller for metal strips, the calibrating including a first groove on a first face wherein a first optical fibre is embedded by an adhesive, a second groove on a second face, being opposite to the first face, wherein a second optical fibre is embedded by means of an adhesive, the first optical fibre and the second optical fibre including a fibre Bragg grating and being essentially parallel, the first optical fibre and the second optical fibre being located at the same distance from the neutral plane N, the first embedded optical fibre and the second embedded optical fibre being configured such that they can be connected to an optical coupler and such that it has a sufficient length to extend over all the rolls of said multi-roll leveller.

8 Claims, 4 Drawing Sheets

(51) Int. Cl.
*G01D 5/353* (2006.01)
*G01D 18/00* (2006.01)
*G02B 6/02* (2006.01)

(58) Field of Classification Search
CPC .. G01B 9/02067; G01D 11/245; G01D 18/00; G01D 3/036; G01D 5/35316; G01D 5/35303; G01D 5/35383; G01D 5/35354; G01D 5/35358; G01D 5/35387; G01D 5/268; G01D 5/35312; G01D 5/353; G01D 5/35345; G01D 5/266; G01D 5/35335; G01D 5/35341; G01D 5/35377; G01D 5/183; G01D 5/344; G01D 5/35306; G01D 5/35325; G01D 5/35364; G01D 5/3538; G01D 5/3539; G01D 5/35393; G01D 5/28; G01D 5/3537; G01L 1/246; G01L 1/242; G01L 1/241; G01L 1/243; G01L 11/025; G01L 11/02; G01L 19/0023; G01L 19/0627; G01L 5/105; G01L 5/226; G01L 9/0076; G01L 9/0089; G02B 1/10; G02B 2006/12107; G02B 2006/12176; G02B 2006/12138; G02B 26/001; G02B 6/0204; G02B 6/022; G02B 6/02204; G02B 6/29317; G02B 6/29319; G02B 6/02138; G02B 6/29395; G02B 6/29398; G02B 6/00; G02B 6/02076; G02B 6/264; G02B 6/29358; G02B 6/42; G02B 6/4202; G02B 6/4206; G02B 6/29359; G02B 6/02095; G02B 6/02176; G02B 6/02185; G02B 6/12007; G02B 6/132; G02B 6/14; G02B 6/2932; G02B 6/29349; G02B 6/02057; G02B 6/02085; G02B 6/021; G02B 6/02147; G02B 6/02152; G02B 6/0218; G02B 6/02209; G02B 6/3854; G02B 6/4215; G02B 6/02033; G02B 6/02042; G02B 6/02104; G02B 6/02195; G02B 6/02328; G02B 6/02333; G02B 6/02347; G02B 6/02366; G02B 6/02376; G02B 6/02385; G02B 6/0365; G02B 6/10; G02B 6/241; G02B 6/262; G02B 6/29322; G02B 6/29394; G02B 6/32; G02B 6/3636; G02B 6/364; G02B 6/3826; G02B 6/3853; G02B 6/02; G02B 6/02061; G02B 6/02066; G02B 6/02071; G02B 6/02123; G02B 6/02171; G02B 6/0219; G02B 6/102; G02B 6/12009; G02B 6/24; G02B 6/2551; G02B 6/2804; G02B 6/29356; G02B 6/29361; G02B 6/2938; G02B 6/4246; G02B 6/4248; G02B 6/4427; G02B 6/4428; G02B 6/502; G02F 1/0118; G02F 1/0147; G02F 2201/30; G02F 2201/307
USPC .......... 33/502; 73/800, 862.045, 1.15, 729.1, 73/862.046; 356/478, 73.1, 519, 480, 356/139.1, 364, 34, 368, 479; 385/13, 385/12, 15, 31, 37
See application file for complete search history.

(56) References Cited

OTHER PUBLICATIONS

International Search Report of PCT/IB2021/0058489 dated Jun. 2, 2022.

* cited by examiner

LEVELLER CALIBRATION DEVICE

The present invention relates to a device for calibrating a multi-roll leveller for levelling a metal strip.

BACKGROUND

Levelling is a finishing operation generally taking place after thermal treatments or rolling operations. Its purpose is to flatten the metallic sheet. It is based on converting geometrical defects into a system of variable residual strains within the thickness by means of alternating bending stresses. It can be done by means of a multi-roll leveller comprising two series of parallel rolls being arranged such that they are imbricated, as represented in FIG. 1. When the sheet passes between these rolls, it is deformed in bending alternatively in one direction and then in an opposite direction. The amplitude of bending decreases from the entrance of the leveller to the exit due to a decrease of the rolls imbrication towards the leveller exit.

The ever-tighter tolerances, in terms of flatness and internal stresses, imposed an ever-increasing control of the levelling operations and thus of the calibration step of the levellers.

SUMMARY OF THE INVENTION

To better grasp the various adjustment parameters, the main components of a multi-roll leveller are represented in FIG. 1 to FIG. 3.

FIG. 1 exhibits a longitudinal section of a leveller 1 comprising a series of lower rolls 2 supported by a lower beam 3 and a series of upper rolls 4 supported by an upper beam 5. During a levelling operation, a metal sheet S is driven through the leveller along a direction indicated by the arrow F.

FIG. 2 exhibits means for adjusting the imbrication of the rolls. The upper beam 5 can be tilted relative to the lower beam 3, the lower beam being considered as the reference plane. The upper beam is supported on an upper frame 6 by adjustment assemblies (*7a*, *7b*), such as screw-nut type with an angle gear. The tilt of the upper beam 5 is adjusted by means of the adjustment assemblies so as to modify the imbrication of the rolls.

FIG. 3 exhibits a front view of a leveller and its means to compensate for the bending of the rolls under load due to reaction forces during the strip levelling. To compensate the rolls bending, the rolls are supported by stages of support and counter-pressure rolls, ramps or rollers. This assembly is mounted in a frame called a cassette placed on a set of counter-pressure ramps 8 being distributed in the transverse direction of the leveller. Moreover, the vertical position of those ramps can be adjusted, e.g. by means of adjustable tapered wedges 9.

Thus, calibrating a leveller involves adjusting many parameters such as: the transverse parallelism between the upper and lower rolls which can be set by screw-nut adjustment assemblies or counter-pressure ramps for example, the rolls imbrication at the entry and at the exit of the leveller by tilting the beam, the counter-pressure means in order to compensate for the bending of the rolls under load. In order to efficiently calibrate the leveller, the amount of play, spring and bending of the rolls during bending have to be known.

Equipment to ease the calibration have been developed. As illustrated in FIG. 4, U.S. Pat. No. 7,584,638 discloses a rigid measurement bar comprising extensometers, which can be placed between the an upper and a lower series of rolls, for measuring elastic deformations. The bar 90 comprises hollows 91 in order to correctly place the extensometers plumb from the rolls. The hollows 91 reproduce a centre-to-centre distance of the rolls of a leveller lower beam. The extensometers 92 are fastened to the upper part of the bar. Consequently, this calibrating bar lacks adaptability because it is designed for a leveller and cannot be easily used for leveller having a different design, e.g. a different centre-to-centre distance of the rolls of the lower beam. Moreover, the extensometers can be damaged during the calibration.

An object of this invention is to solve the aforementioned issues. In particular, the object of the invention is to determine, precisely and easily, the key parameters needed to perform a reproducible under-load calibration for any multi-roll leveller without damaging the measuring means, i.e. the extensometers.

The present invention provides a calibrating bar having a neutral plane N, for calibrating a multi-roll leveller for metal strips, said calibrating bar 10 having a thickness from 1.0 mm to 2.0 mm and a yield strength from 1000 MPa to 2000 MPa, comprising a first groove 11 on a first face 12 wherein a first optical fibre 13 is embedded by means of an adhesive 14, a second groove 15 on a second face 16, being opposite to said first face 12, wherein a second optical fibre 17 is embedded by means of an adhesive 18, said first optical fibre 13 and said second optical fibre 17 comprising a fibre Bragg grating, being essentially parallel, said first optical fibre and said second optical fibre being located at the same distance from said neutral plane N, said first embedded optical fibre 13 and said second embedded optical fibre 17 being configured such that they can be connected to an optical coupler and such that it has a sufficient length to extend over all the rolls of said multi-roll leveller.

DETAILED DESCRIPTION

Figure 1:
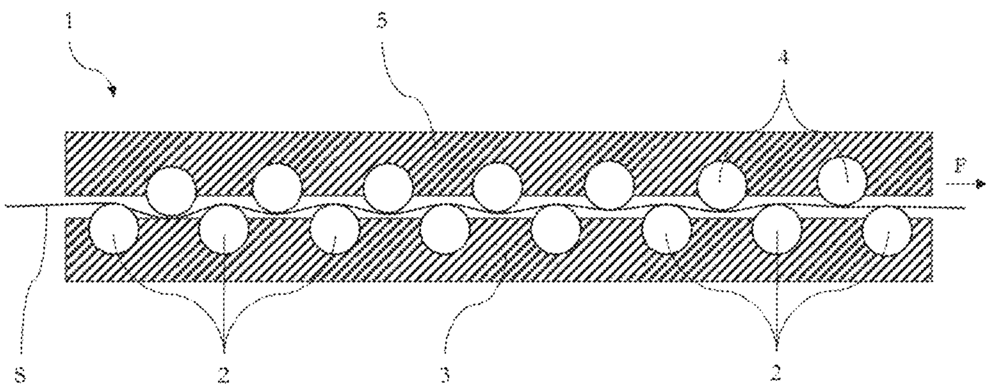
FIG. 1 embodies a longitudinal section of a leveller.
Figure 2:
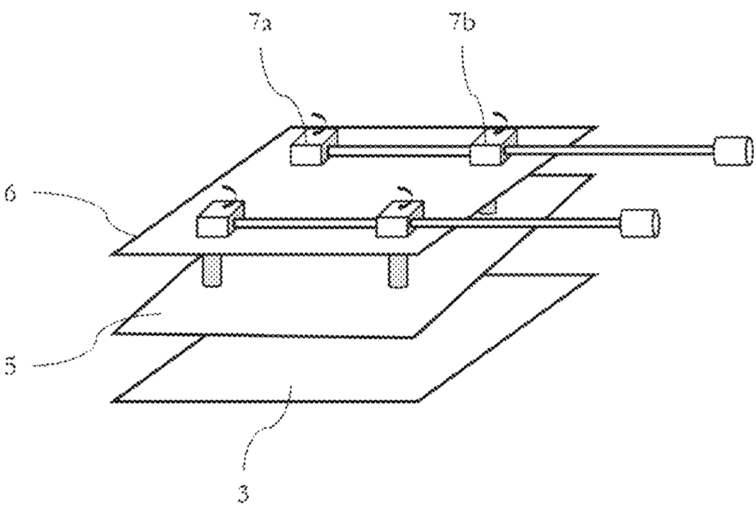
FIG. 2 embodies means for adjusting the imbrication of the rolls.
Figure 3:
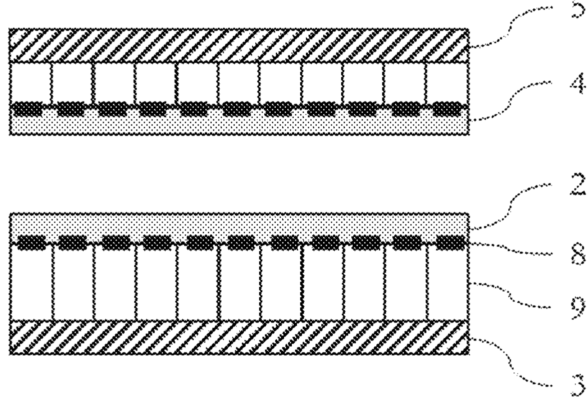
FIG. 3 embodies a front view of a leveller and its means to compensate for the bending of the rolls under load due to reaction forces during the strip levelling.
Figure 4:
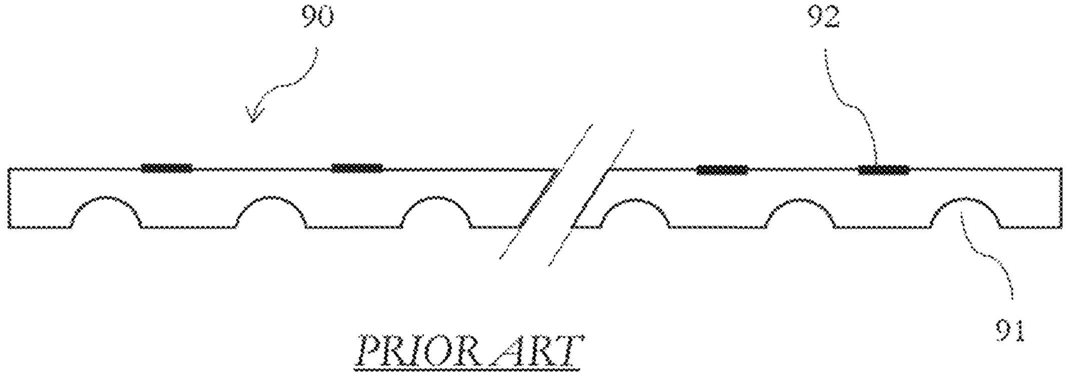
FIG. 4 illustrates a measurement bar as known in the prior art.
Figure 5:
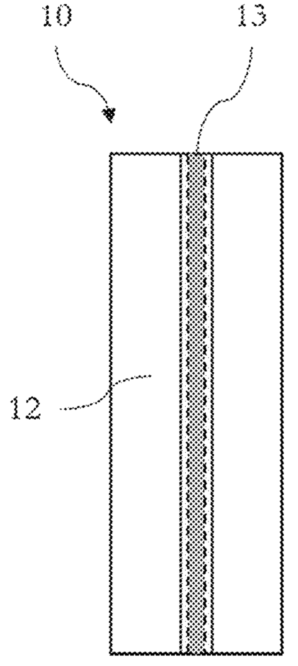
FIG. 5 and FIG. 6 embody a calibrating bar according to the invention.
Figure 6:
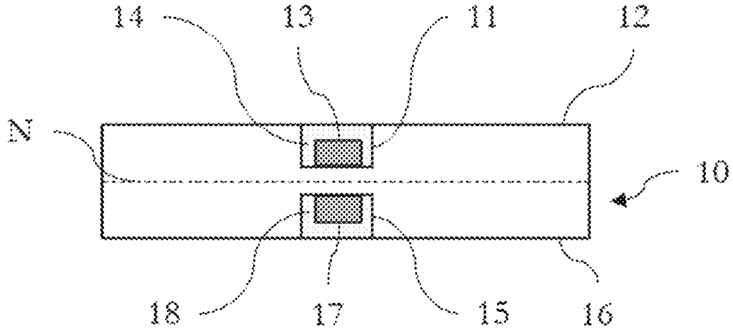

The invention, as illustrated in FIG. 5 and FIG. 6, relates to a calibrating bar 10 having a neutral plane, for calibrating a multi-roll leveller for metal strips, having a thickness from 1.0 mm to 2.0 mm and a yield strength from 1000 MPa to 2000 MPa, comprising a first groove 11 on a first face 12 wherein a first optical fibre 13 is embedded by means of an adhesive 14, a second groove 15 on a second face 16, being opposite to said first face 12, wherein a second optical fibre 17 is embedded by means of an adhesive 18, said first optical fibre 13 and said second optical fibre 17 comprising a fibre Bragg grating and being essentially parallel, said first optical fibre and said second optical fibre being located at the same distance from said neutral plane N, said first embedded optical fibre 13 and said second embedded optical fibre 17 being configured such that they can be connected to an optical coupler and such that it has a sufficient length to extend over all the rolls of said multi-roll leveller.

This combination of thickness and yield strength is chosen in such a way that the calibration results only in the strain of the calibration bar within the elastic range. It also makes it possible to withstand the different levels of force of the machine used to flatten the products without reaching the plastic strain.

This thickness, between 1.0 and 2.0 mm, enables the formation of a groove wherein an optical fibre can be embedded.

Preferably the yield strength is between 1400 MPa and 1600 MPa.

The calibration bar is made of metal or metal alloy and preferably of steel. Even more preferably, the calibration bar is made of stainless steel.

The neutral plane is the plane along which there are no longitudinal stresses or strain during bending.

Preferably, the calibrating bar has a quadrilateral, rectangular or square section. In that case, the neutral plane is at half the thickness when no traction is applied, as illustrated in FIG. 6.

In the context of this invention, a groove is to be understood as a canal cut. Said groove can be of any shape and form as long as an optical fibre can be embedded within. Preferably, the grooves have a quadrilateral, rectangular or square section.

The adhesive is preferably an epoxy based adhesive.

The optical fibres are configured such that an optical coupler can be connected to them. This can be done by means of a casing.

The optical fibres have a length which permits the fibres to extend over all the rolls of said multi-roll leveller. So, the calibrating bar has a grooves long enough to extend over all the rolls of said multi-roll leveller.

The principle behind the measurement, for the calibration of a multi-roll leveller, is the Fresnel reflection. It describes the reflection and transmission of an incident light on an interface between two different optical media. In this invention, interfaces are made by means of a fibre Bragg grating.

So, the percentage of reflected light varies in function of the wavelength. This percentage has a maximum at the Bragg wavelength $\lambda_B$. The Bragg wavelength is sensitive to strain and temperature.

The Bragg wavelength $\lambda_B$ is shifted by change of temperature and/or strain. This shift $\Delta\lambda_B$, is approximated by (1):

$$\Delta\lambda_B = \lambda_B[C_S \cdot \epsilon + C_T \cdot \Delta T] \tag{1}$$

wherein $\lambda_B$ is the Bragg wavelength, $C_S$ is the coefficient of strain, $\epsilon$ is the applied strain, $C_T$ is the coefficient of temperature and $\Delta T$ is a change in temperature.

Consequently, the strain of the calibration bar can be measured by interrogating the calibration bar using optical frequency domain reflectometry (OFDR).

Figure 7:
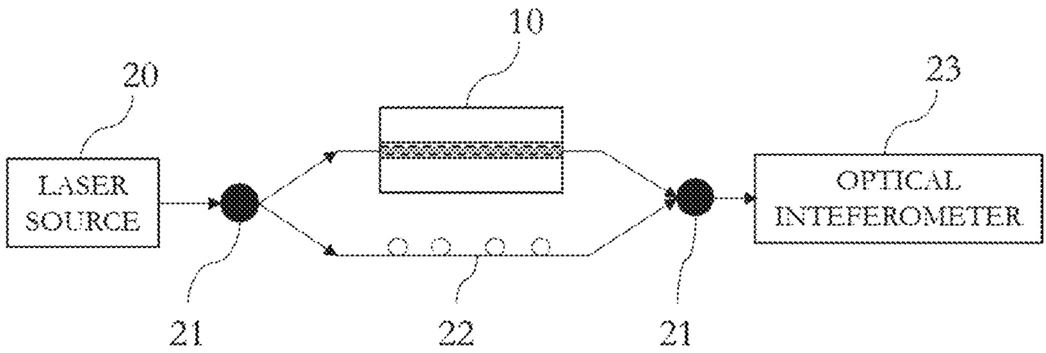
FIG. 7 illustrates schematically the measurement using a calibrating bar according to the present invention.

This method, as illustrated in FIG. 7, requires a tuneable laser source 20, optical couplers 21, an optical device 22 able to create a reference path (e.g. BroadBand Reflector), a testing device (e.g. the calibrating bar) and an optical interferometer 23.

The method comprises the following steps: the tuneable laser source 20 emits a light. An optical coupler 21, splits the light between two paths: a measurement path (i.e. the calibrating bar) and a reference path. Then the lights (i.e. the signals) from the measurement path and from the reference path are recombined using an optical coupler 21 and then sent to an optical interferometer 23.

As known per the skilled in the art, in the optical interferometer, a Fourier transform of the light signal yields the phase and amplitude of the signal as a function of the length along the sensor. The strain is obtained by comparing the signals from the measurement path and from the reference path.

In the case of this invention, at the beginning of the calibration step, the calibration bar is put between the upper and the lower rolls of a multi-roll leveller, said upper and lower rolls are not imbricated. Then the upper and lower rolls are imbricated which deforms the calibration bar and applies a strain on the embedded optical fibres and on the fibre Bragg grating. This strain on the fibre Bragg grating leads to a shift of the Bragg wavelength for each of the reflector of said grating.

However, as explained above, the Bragg wavelength is also impacted by a change of temperature which is detrimental for the calibration step as only the strain underwent by each reflector (the one plumb from the rolls) needs to be measured.

In order to solve the problem of measuring a change of temperature and a strain and not only a strain, the calibration bar comprises an optical fibre on both faces (e.g. on each side of the neutral plane) at equidistance from the neutral plane. Such an arrangement permits to have one reflector in compression and the other one in traction and enables to measure the strain.

For example, during the calibration, the reflector of the first optical fibre plumb from the second roll is in compression, with an unknown strain $\varepsilon_{COMPRESSION}$, while the reflector of the second optical fibre plumb from the second roll is in traction with an unknown strain $\varepsilon_{TRACTION}$. Both of them undergoing the same change of temperature $\Delta T$. The interferometer measures the shift of the Bragg wavelength for both reflector (i.e. interface), as expressed by formulas 2.1 and 2.2.

$$\Delta\lambda_{B1} = \lambda_B[C_S \cdot \epsilon_{COMPRESSION} + C_T \cdot \Delta T] \tag{2.1}$$

$$\Delta\lambda_{B2} = \lambda_B[C_S \cdot \epsilon_{EXTENSION} + C_T \cdot \Delta T] \tag{2.2}$$

It is possible to suppress the temperature influence when combining the measured $\Delta\lambda_{B1}$ and $\Delta\lambda_{B2}$ by subtracting one to the other, as expressed by formula 3, which permits to find the shift of Bragg wavelength due to the strain.

$$\Delta\lambda_{B1} - \Delta\lambda_{B2} = \lambda_B \times C_S[\epsilon_{COMPRESSION} - \epsilon_{EXTENSION}] \tag{3}$$

Because both optical fibres are placed at equidistance from the neutral plane, the value of the strain in compression is the opposite as the one in traction so: $\varepsilon_{COMPRESSION}=-\varepsilon_{EXTENSION}$ which permits to find the strain as per the formula 4:

$$\frac{\Delta\lambda_{B1}-\Delta\lambda_{B2}}{\lambda_B\times C_S\times 2}=\epsilon_{COMPRESSION} \quad (4)$$

Preferably, said first groove and said second groove have a depth from 150 μm to 400 μm. An optical fibre is considered to have a diameter from 50 to 125 μm. So, this groove depth range permits to have an optical fibre, inside said the groove, from 25 μm to 350 μm below the surface of said face.

It is possible to embed an optical fibre below the surface of a face so the optical fibre does not protrude over said face, thus avoiding direct contact with the leveller rolls. Moreover, the optical fibre is kept away from the neutral plane when the calibrating bar is under tension.

Preferably, said first groove and said second groove are essentially straight and said first optical fibre 13 and said second optical fibre are essentially straight. Even more preferably, said first groove and said second groove are straight and said first optical fibre 13 and said second optical fibre are straight.

Preferably, said first optical fibre and said second optical fibre have an uniform fibre Bragg grating. For example, the optical fibre has an uniform Bragg grating wherein the reflectors are spaced from one another of a distance of 1.6 mm.

Preferably, said first optical fibre and said second optical fibre are a monomodal optical fibre. This type of optical fibre permits to increase the measurement accuracy since it allows a cleaner spectral response.

Even more preferably, said first optical fibre and said second optical fibre are monomodal optical fibres able to operate in a range from 1500 to 1600 nm.

Figure 8:
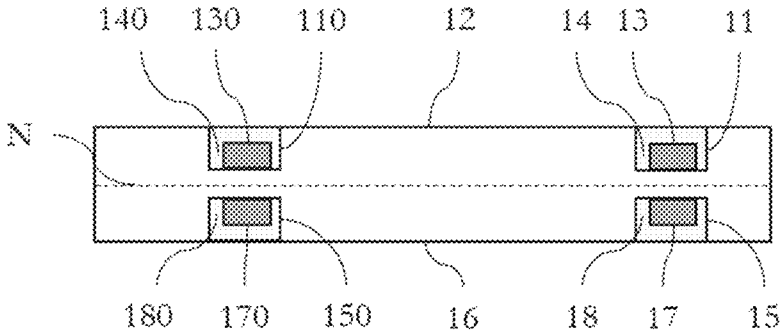
FIG. 8 embodies a calibrating bar according to a preferred mode of the invention.

The first and second optical fibres can be considered as a first pair of optical fibres. The calibration bar can comprise several pairs of optical fibres, and associated grooves and adhesive. For example, as illustrated in FIG. 8, said calibration bar comprises

- a third groove 110 on said first face 12 wherein a third optical fibre 130 is embedded by means of an adhesive 140,
- a fourth groove 150 on said second face 16, being opposite to said first face 12, wherein a fourth optical fibre 170 is embedded by means of an adhesive 180,
- being configured such that said first optical fibre, said second optical fibre, said third optical fibre and said fourth optical fibre are parallel and at the same distance from said neutral plane N
- said third optical fibre and said fourth optical fibre being configured such that they can be connected to an optical coupler and such that it has a sufficient length to extend over all the rolls of said multi-roll leveller.

Preferably, the calibration bar comprises a pair of optical fibres for each counter pressure ramps of the calibrated multi-roll leveller.

Experimental Test

In order to demonstrate that the claimed calibration bar is easy to use and do not require adaption to each leveller, two different multi-rolls levellers have been calibrated using a calibration bar as illustrated in FIG. 6.

The calibrating bar used for the experiment is a calibrating bar having a thickness of 1.8 mm, a length of 800 mm, a yield strength of 1400 MPa and made of stainless steel.

The calibrating bar comprises

- a first groove having a depth of 200 μm on a first face wherein a monomodal optical fibre comprising a fibre Bragg grating is embedded, at the bottom of the groove, by means of an epoxy based adhesive,
- a second groove having a depth of 200 μm on a second face wherein a monomodal optical fibre comprising a fibre Bragg grating is embedded, at the bottom of the groove, by means of an epoxy based adhesive.

The optical fibres are essentially parallel and are connected to an optical coupler.

The first multi-roll leveller comprises 19 working rolls (10 upper rolls and 9 lower rolls) having a diameter of 22 mm while the second comprises 17 working rolls (9 upper rolls and 8 lower rolls) having a diameter of 61.91 mm.

Figure 9:
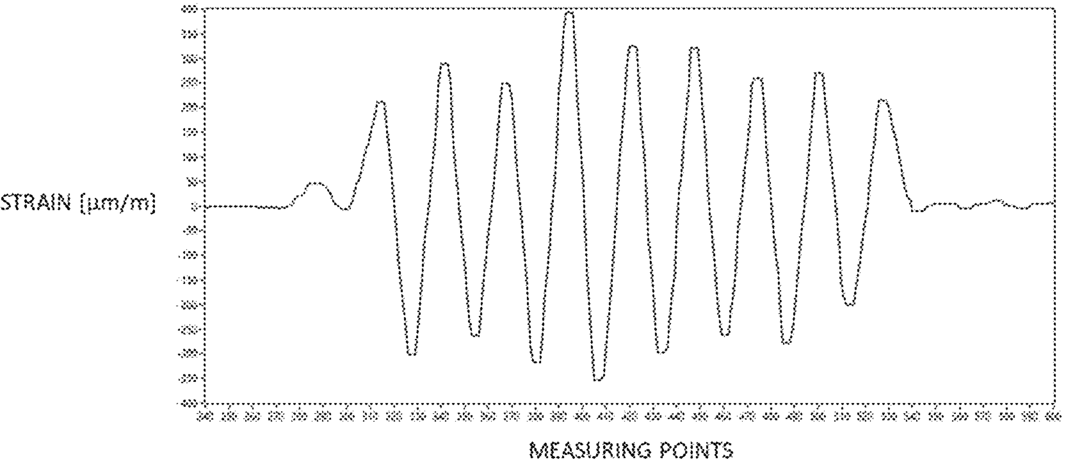
FIG. 9 and FIG. 10 illustrate a strain measurement achievable with a calibrating bar according to the invention.
Figure 10:
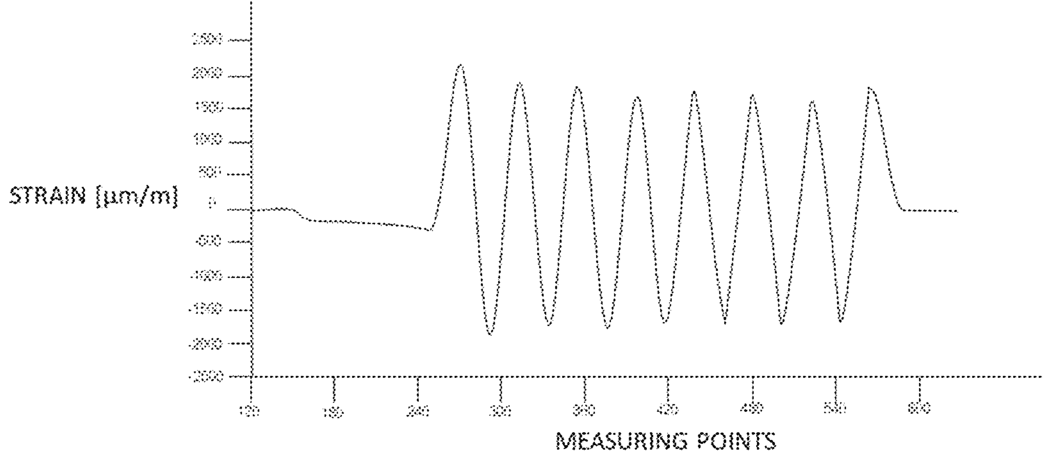

In order to calibrate the multi-roll levellers, the calibrating bar is positioned, along the strip movement direction, at the centre of the leveller width, on the lower working rolls. Then, the upper working rolls are lowered until they contact the calibrating bar. The measured strains have been plotted on FIG. 9 for the first leveller and on FIG. 10 for the second leveller. Each of the peak represents the strain of the calibrating bar for each roll, from the second roll to penultimate roll of each leveller.

Ultimately, the measurements have been used to calibrate the leveller as known in the state of the art.

Consequently, the claimed calibration bar enables a skilled in the art to easily and precisely perform the calibration of a multi-roll leveller without damaging the measuring means, i.e. the optical fibre.

What is claimed is:

1. A calibrating bar having a neutral plane for calibrating a multi-roll leveller for metal strips, the calibrating bar having a thickness from 1.0 mm to 2.0 mm and a yield strength from 1000 MPa to 2000 MPa, the calibrating bar comprising:

- a first groove on a first face, a first optical fibre being embedded in the first groove via an adhesive;
- a second groove on a second face opposite to the first face, a second optical fibre being embedded in the second groove via a further adhesive;
- the first optical fibre and the second optical fibre comprising a fibre Bragg grating, being parallel;
- the first optical fibre and the second optical fibre being located at the same distance from the neutral plane; and
- the first embedded optical fibre and the second embedded optical fibre being connectable to an optical coupler so as to have a sufficient length to extend over all rolls of the multi-roll leveller.

2. The calibrating bar as recited in claim 1 wherein the first groove and the second groove have a depth from 175 μm to 400 μm.

3. The calibrating bar as recited in claim 2 wherein the first optical fibre in the first groove is from 25 μm to 350 μm below a surface of the first face and the second optical fibre in the second groove is from 25 μm to 350 μm below a surface of the second face.

4. The calibrating bar as recited in claim 1 wherein the first groove and the second groove are straight and the first optical fibre and the second optical fibre are straight in the respective first and second grooves.

5. The calibrating bar as recited in claim 1 wherein the first optical fibre and the second optical fibre have an uniform fibre Bragg grating.

6. The calibrating bar as recited in claim 1 wherein the first optical fibre and the second optical fibre are a monomodal optical fibre.

7. The calibrating bar as recited in claim 6 wherein the first optical fibre and the second optical fibre are monomodal optical fibres operable in a range from 1500 to 1600 nm.

8. The calibrating bar as recited in claim 1 further comprising:

a third groove on the first face, a third optical fibre being embedded in the third groove via a third adhesive;

a fourth groove on the second face, a fourth optical fibre being embedded in the fourth groove via a fourth adhesive;

the third optical fibre and the fourth optical fibre comprising a fibre Bragg grating and being parallel;

the first optical fibre, the second optical fibre, the third optical fibre and the fourth optical fibre being parallel and at the same distance from the neutral plane;

the third optical fibre and the fourth optical fibre being connectable to the optical coupler or a further optical coupler sp as to have sufficient length to extend over all rolls of the multi-roll leveller.

* * * * *